(12) United States Patent
Boehnke et al.

(10) Patent No.: US 6,674,732 B1
(45) Date of Patent: Jan. 6, 2004

(54) TRANSMITTING METHOD, RECEIVING METHOD, TRANSMITTER, AND RECEIVER

(75) Inventors: Ralf Boehnke, Esslingen (DE); Kentaro Odaka, Tokyo (JP); Hamid Amir-Alikhani, Leonberg (DE); Richard Stirling-Gallacher, Stuttgart (DE); Seiichi Izumi, Fellbach (DE); Mitsuhiro Suzuki, Chiba (JP)

(73) Assignees: Sony Corporation, Tokyo (JP); Sony International (Europe) G.m.b.H., Koeln-Ossendorf (DE)

( * ) Notice: Subject to any disclaimer, the term of this patent is extended or adjusted under 35 U.S.C. 154(b) by 0 days.

(21) Appl. No.: 09/402,637

(22) PCT Filed: Feb. 13, 1998

(86) PCT No.: PCT/JP98/00600
§ 371 (c)(1),
(2), (4) Date: Jan. 24, 2000

(87) PCT Pub. No.: WO99/41866
PCT Pub. Date: Aug. 19, 1999

(51) Int. Cl.⁷ .................................................. H04B 7/216
(52) U.S. Cl. ........................................ 370/320; 370/342
(58) Field of Search ................................. 370/320, 321, 370/322, 329, 335, 337, 342, 347

(56) References Cited

U.S. PATENT DOCUMENTS 5,533,013 A * 7/1996 Leppanen .................... 370/18
6,339,612 B1 * 1/2002 Stewart et al. ............... 375/140

* cited by examiner

Primary Examiner—Wellington Chin
Assistant Examiner—Brenda Pham
(74) Attorney, Agent, or Firm—Jay H. Maioli

(57) ABSTRACT

A time slot which is formed by time-division multiplexing is divided into a plurality of blocks in at least a frequency direction, and also within each one of said plurality of blocks a plurality of subcarriers are formed. A predetermined number of plurality of blocks forms one communication channel, whereby a plurality of communications are formed within a time slot. With this, one time slot can be multiplexed by communication of multiple carriers separated in frequency. In this manner, with simple constitution, communication can be performed satisfactorily even in an environment where a multiple path is present.

8 Claims, 11 Drawing Sheets

TRANSMITTING METHOD, RECEIVING METHOD, TRANSMITTER, AND RECEIVER

TECHNICAL FIELD

The present invention relates to a transmitting method, a receiving method, a transmitter, and a receiver, and is suitably applicable, for example, to cellular radio communication systems.

BACKGROUND ART

In recent years, a cellular radio communication system that is represented by a portable telephone system has been put to practical use and employed in the field of mobile communication. This cellular radio communication system divides an area providing communication services into cells of a desired size, and installs base stations as fixed stations within the cells, respectively. Communication terminal equipment as a mobile station communicates by radio with a base station whose communication state is believed to be most satisfactory.

As for the communication method between the base station and the communication terminal equipment, a wide variety of methods have been proposed. As the representative one, a time-code-division multiple access method combining a time-division multiple access method (TDMA method) and a code-division multiple access method (CDMA method) together has been proposed.

This time-code-division multiple access method, as shown in FIG. 1, divides a band of 1.2 MHz into time cycles of 4.615 ms (this time cycle will hereinafter be called a frame) in a time axis direction. Each frame is further divided at time intervals of 577 µs, thereby dividing each frame into time slots TS0 to TS7. The divided time slots TS0 to TS7 are used as communication channels in a time direction, whereby time-division multiple access is performed.

Also, in this time-code-division multiple access method, as shown in FIG. 2, in each time slot a transmission symbol which is an object of transmission is multiplied by a diffusion code and is transmitted. At this time, eight kinds of diffusion codes are prepared per one time slot, whereby eight communication channels by code division are ensured per one time slot.

Thus, in this time-code-division multiple access method, eight communication channels by code division are ensured per one time slot and also eight time slots are formed in a time direction per one frame of 4.615 ms, whereby 64 communication channels are ensured in 1.2 MHz×4.615 ms.

Now, in the case where transmission is actually performed by this method, a transmission symbol with a symbol rate of 135 ksymbol/s is first diffused into eight times as many spectra by the use of a diffusion code with a speed which is eight times the speed so that the chip rate becomes 1080 kchip/s. The diffused transmission signal is transmitted at the timing of time slots allocated to a local station. This makes it possible to realize the communication based on this time-code-division multiple access method.

Note that in each time slot, as shown in FIG. 3, 28 transmission symbols (224 chips after diffusion) are transmitted at the first half portion of the interval of 577 µs as a whole, then 198 chips of predetermined data are transmitted as a training sequence for the characteristic estimation of a transmission line, and then 28 transmission symbols are transmitted again. Incidentally, after the transmission symbol which is last transmitted, a transmission stop interval called a guard interval is provided. With this guard interval, signal collision by a shift in the signal arrival time is prevented.

Now, for the cellular radio communication system which performs communication by the use of a time-code-division multiple access method such as this, a description will be made with FIG. 4. In FIG. 4, reference numeral 1 denotes a transmitter which is provided in a base station, and 2 denotes a receiver which is provided in communication terminal equipment. In the transmitter 1 of the base station, for example if it is assumed that radio communications of eight channels are present, the transmission symbols S1 to S8 of the eight channels will be respectively input to a CDMA modulation section 1A. The CDMA modulation section 1A has eight kinds of diffusion codes which are in an orthogonal relation with one another, and multiplies the transmission symbol S1 by the first diffusion code of the eight kinds of diffusion codes, thereby performing spectrum diffusion modulation on the transmission symbol S1. Likewise, the CDMA modulation section 1A multiplies the input transmission symbols S2 to S8 by the second to the eighth diffusion codes, respectively, and thereby performs spectrum diffusion modulation on the transmission symbols S2 to S8. Thus, in the CDMA modulation section 1A, the transmission symbols of the channels thus modulated by spectrum diffusion are combined together, and this is output to a time-division transmitting section 1B as a transmission signal S9.

The time-division transmitting section 1B converts the frequency of the input transmission signal S9 to a frequency band allocated to this communication system, and the transmission signal S10 is transmitted through an antenna 1C in a burst manner by the use of the time slot TS0, for example, among the above-mentioned time slots.

On the other hand, in the receiver 2, a reception signal S11 received by an antenna 2A is input to a time-division receiving section 2B. The time-division receiving section 2B fetches the signal component of the time slot TS0 from this reception signal S11 and performs a frequency conversion process on the signal component, whereby a reception signal S12 of the base band corresponding to the transmission signal S9 of the transmitter 1 is obtained and this is output to a matched filter 2C.

The matched filter 2C consists of a shift register, a multiplier, and an adder. For example, if the symbol received by this receiver 2 is taken to be the transmission symbol S1, the same code string as the first diffusion code, used when the transmission symbol S1 is diffused, is used as the coefficient of the multiplier. In the multiplier the chips, output from the taps of the shift register to which the reception signal S12 was input, are multiplied by respective code sequences. The matched filter 2C adds the multiplication results by the adder, thereby restoring the transmission symbol S1.

Thus, if such a transmitter 1 and receiver 2 are provided in the base station and communication terminal equipment respectively, communication by a time-code-division multiple access method can be realized.

Incidentally, when the transmission signal S10 multiplexed with such a time-code-division multiple access method is received and from the received signal the transmission symbol of one channel is restored, if a multiple path, etc., are present in the propagation path, the orthogonal relation of the diffusion codes used in the channels will not be entirely held. Therefore, there is a problem that in a simple matched filter such as the matched filter 2C shown in FIG. 4, the signal components of the other 7 channels interfere and the transmission symbol of the channel cannot be accurately restored.

As a method of avoiding this, a method employing a decoding path called a multi-user detection has been proposed. This method, as shown in FIG. 5, restores all transmission symbols S1 to S8 of eight channels from the reception signal S12 by a multi-user detection 2D, taking mutual interference quantities into consideration. Since the transmission symbol is restored by considering the interference quantity which each channel undergoes, this method can reduce the influence of an interference wave in comparison with the method employing a matched filter and restore the transmission symbol more accurately.

However, in this method employing a multi-user detection, not only channels which must be originally decoded but also all channels multiplexed must be decoded and therefore there is a problem that the process associated with decoding becomes complicated and also the amount of processing increases considerably. Specifically, it has been said that the amount of processing increases by about $8^2$ times in comparison with the method employing a matched filter.

DISCLOSURE OF THE INVENTION

The present invention has been made in view of the aforementioned points, and an object of the invention is to propose a transmitting method, a receiving method, a transmitter, and a receiver which are simple in constitution and can perform satisfactory communication even in an under environment where a multiple path is present.

To solve such problems, in the present invention, a time slot formed by time-division multiplexing is divided into a plurality of blocks in at least a frequency direction. Also, a plurality of subcarriers are formed within the block. One communication channel is formed with a predetermined number of said blocks, thereby forming a plurality of communication channels within the time slot. During communication, information of a transmission object is transmitted with a plurality of subcarriers by the use of a desired communication channel of a plurality of communication channels.

In this way, the time slot formed by time-division multiplexing is divided into a plurality of blocks at least in a frequency direction and also within each block a plurality of subcarriers are formed. One communication channel is formed with a predetermined number of different blocks, whereby a plurality of communication channels is formed within the time slot. With this, one time slot can be multiplexed by communication of multiple carriers separated in frequency. Therefore, with simple constitution, communication can be performed satisfactorily even in an environment where a multiple path is present.

BEST MODE FOR CARRYING OUT THE INVENTION

One embodiment of the present invention will hereinafter be described in detail with reference to the drawings.

Figure 1:
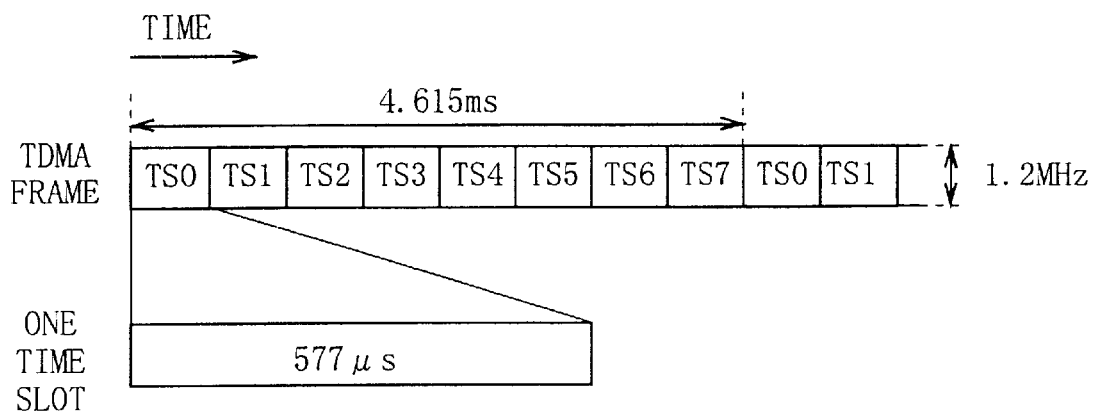
FIG. 1 is a schematic view used in the description of the time slot of a conventional time-code-division multiple access method.
Figure 2:
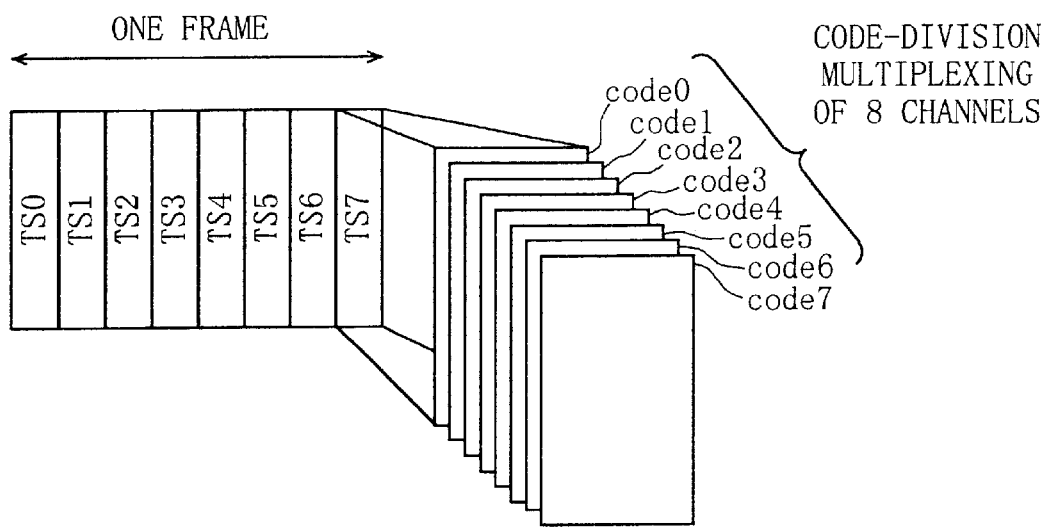
FIG. 2 is a schematic view used in the description of the multiplexing within the time slot of the conventional time-code-division multiple access method.
Figure 3:
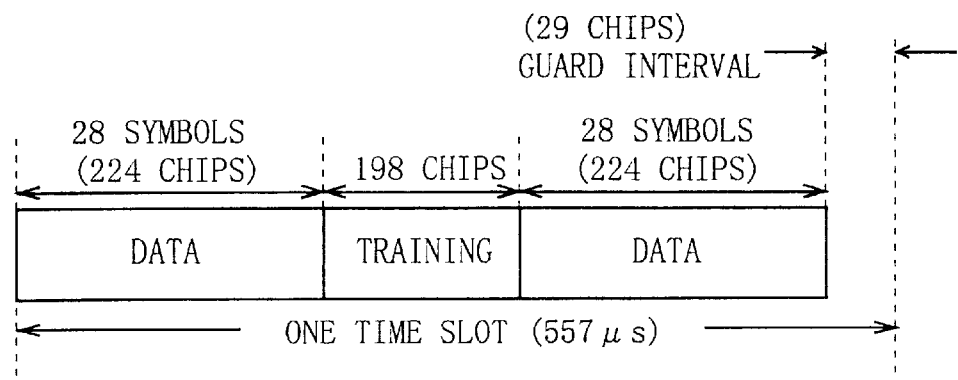
FIG. 3 is a timing chart showing the transmitting timing within the time slot.
Figure 4:
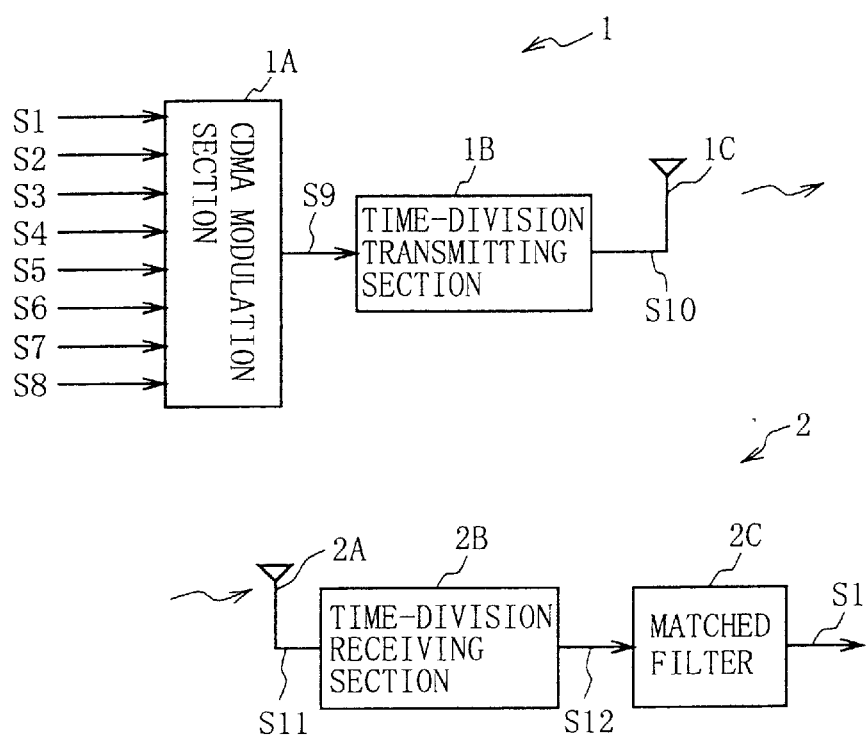
FIG. 4 is a block diagram showing the constitutions of a transmitter and a receiver according to the conventional time-code-division multiple access method.
Figure 5:
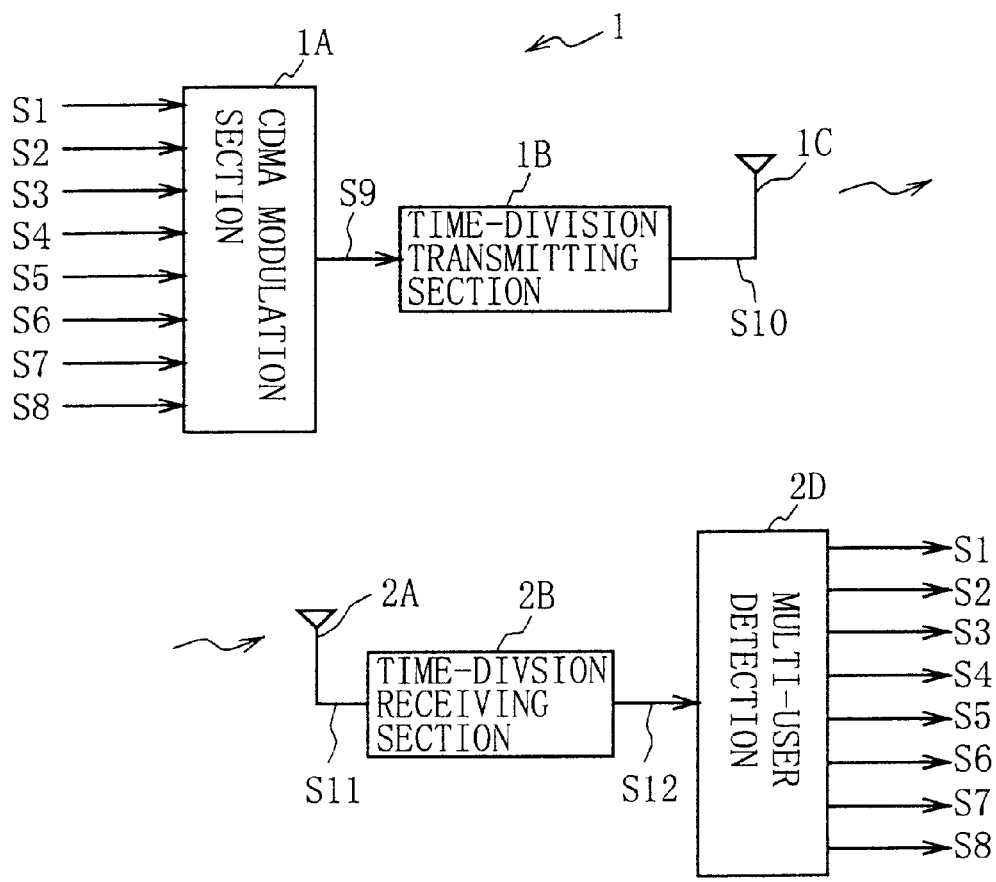
FIG. 5 is a block diagram showing the constitution of a receiver employing a multi-user detection.
Figure 6:
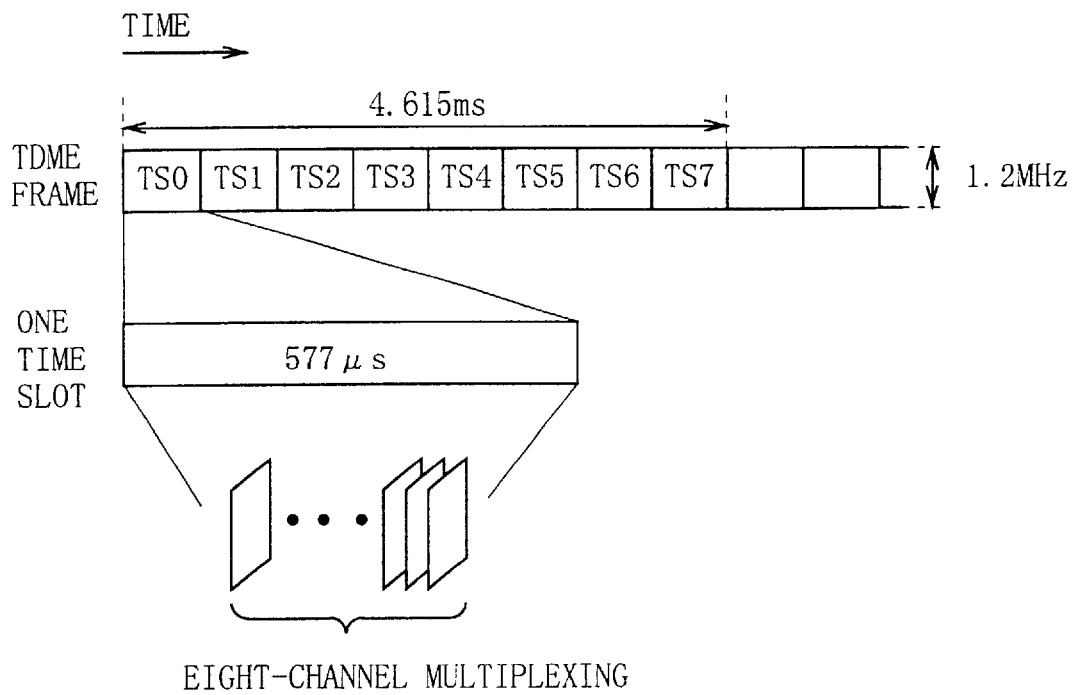
FIG. 6 is a schematic view showing the structure of a time slot used in the description of the principles of a communication method according to the present invention.

Initially, a description will be made of the principles of a communication method according to the present invention. As shown in FIG. 6, even in the communication method according to the present invention, a band of 1.2 MHz is divided into frames with a width of 4.615 ms in a time axis direction. Each frame is further divided at intervals of 577 µs, thereby dividing each frame into eight time slots TS0 to TS7. The divided time slots TS0 to TS7 are used as communication channels in a time direction, thereby performing time-division multiple access.

Also, in the communication method according to the present invention, multi-carrier communication separated in a frequency direction, such as that described later, is performed with the time slots TS0 to TS7, whereby eight communication channels are ensured per one time slot. With this, in the communication method according to the present invention, 64 communication channels are ensured in 1.2 MHz×4.615 ms.

Figure 7:
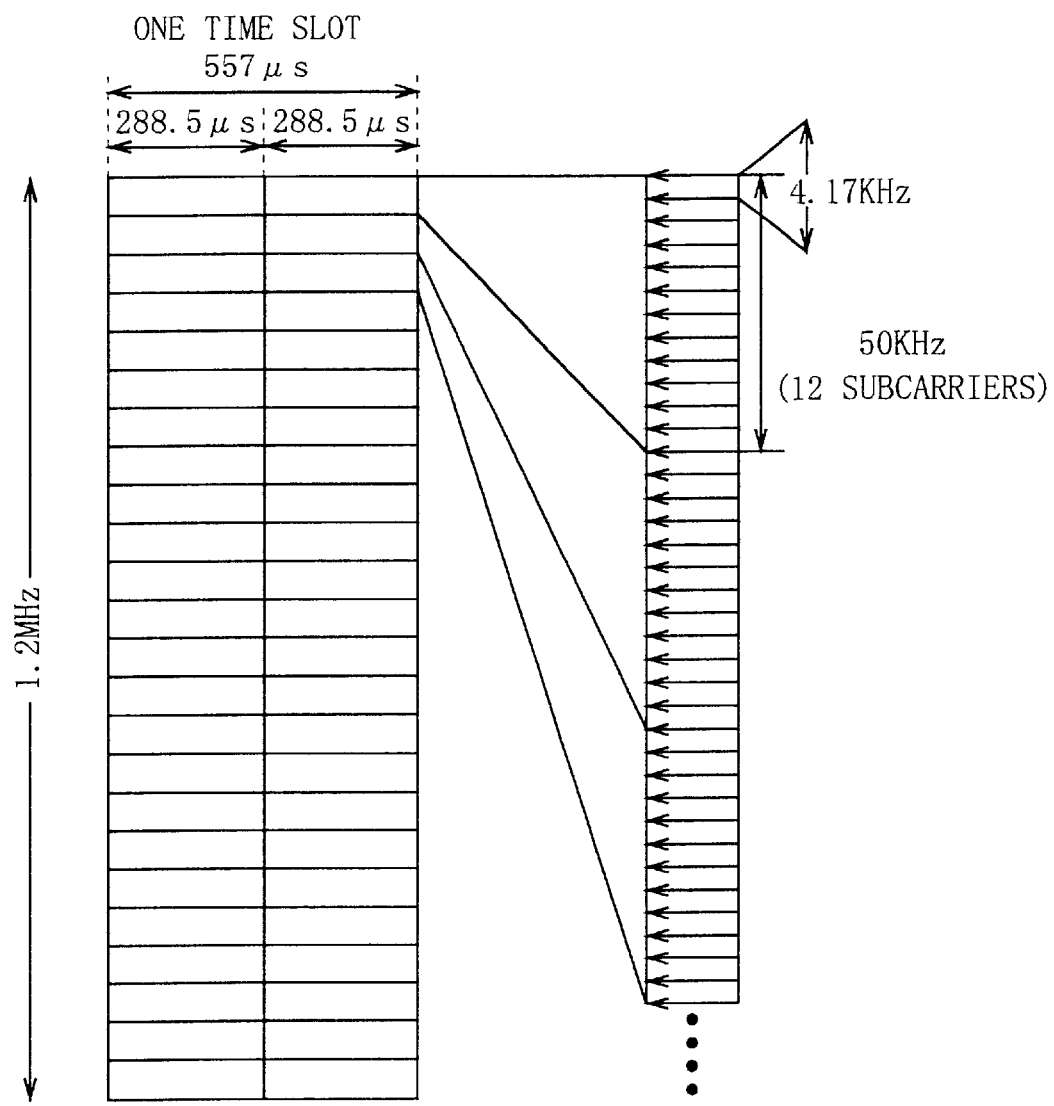
FIG. 7 is a schematic view used in the description of a method of multiplexing one time slot.

In the communication method according to the present invention, as shown in FIG. 7, one time slot is divided into intervals of 288.5 µs in a time direction, thereby dividing one time slot into two blocks. Also, a band of 1.2 MHz is divided at intervals of 50 kHz in a frequency direction, thereby dividing the band into 24 blocks. Therefore, since one time slot is divided into two blocks in the time direction and 24 blocks in the frequency direction, one time slot is divided into 48 blocks in all.

Also, within each block, 12 subcarriers are formed at intervals of 4.17 kHz. Therefore, within a band of 1.2 MHz, 288 subcarriers are formed in all. In the communication method by the present invention, multicarrier communication by an orthogonal frequency division multiplex (OFDM) method is performed by the use of 288 subcarriers formed in this band of 1.2 MHz.

In the OFDM method, transmission symbols arranged in a time axis are superposed one by one on a plurality of subcarriers arranged in an orthogonal relation in a frequency axis and are transmitted. At this time, if the subcarrier superposed with the transmission symbol is transmitted by the time obtained with the reciprocal of the subcarrier interval, the orthogonal relation between the subcarriers will be held. In this case, since the frequency interval of the subcarrier is 4.17 kHz, modulation time t which actually becomes necessary will be 240 μs (=1/4.17 kHz).

Figure 8:
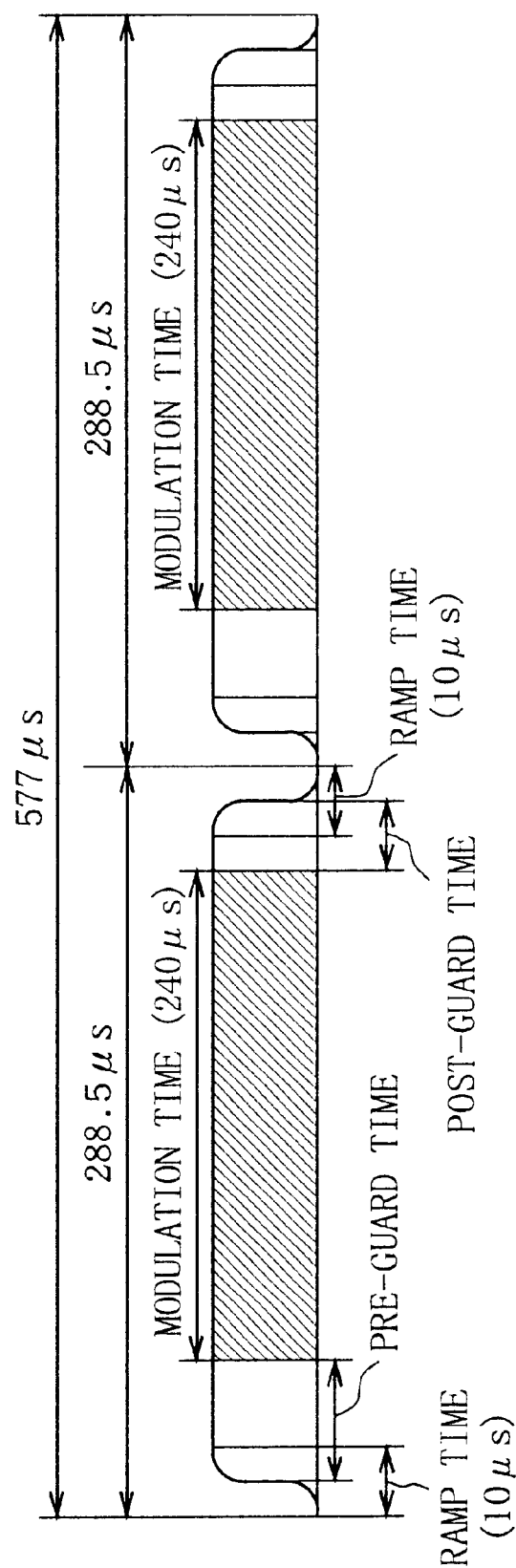
FIG. 8 is a timing chart showing the modulation time of a subcarrier in one time slot.

Therefore, as shown in FIG. 8, in 288.5 μs at which one time slot is divided into two parts, the modulation time t substantially associated with transmission of a subcarrier becomes 240 μs. In this case, the remaining time of 288.5 μs is not entirely used, but actually ramp times of 10 μs compensating for the rise and fall times of a subcarrier which is transmitted in a burst manner are provided before and after one modulation time t, respectively. Also, a pre-guard time and post-guard time for preventing waveform distortion due to a multiple path are provided for a predetermined time before and after one modulation time t, respectively. Therefore, in the communication method according to the present invention, the ramp time and the guard time are added to one modulation time t, whereby the entire area of 288.5 μs is used and a subcarrier is transmitted. Note that in the ramp time, pulse shaping is performed so that a subcarrier rises gradually or falls gradually based on a predetermined function. With this, unnecessary radiation outside a band is suppressed.

Incidentally, as described above, if one time slot is divided into two blocks in a time axis direction and 24 blocks in a frequency direction, one time slot will be divided into 48 blocks as a whole. If one of the 48 blocks is used as one communication channel, a maximum of 48 communication channels will be ensured per one time slot. However, if one block is used as one communication channel, the transmission rate per unit time will be reduced compared with a conventional time-code-division multiple access method. Therefore, in the communication method according to the present invention, one communication channel is constituted by 6 blocks consisting of three blocks of the first half portion (i.e., first half interval of 288.5 μs) of one time slot and three blocks of the second half portion (i.e., second half interval of 288.5 μs) of one time slot, thereby forming eight communication channels per one time slot. In this manner, if 6 blocks per one communication channel is used, a transmission rate nearly equal to the conventional time-code-division multiple access method can be ensured.

Figure 9:
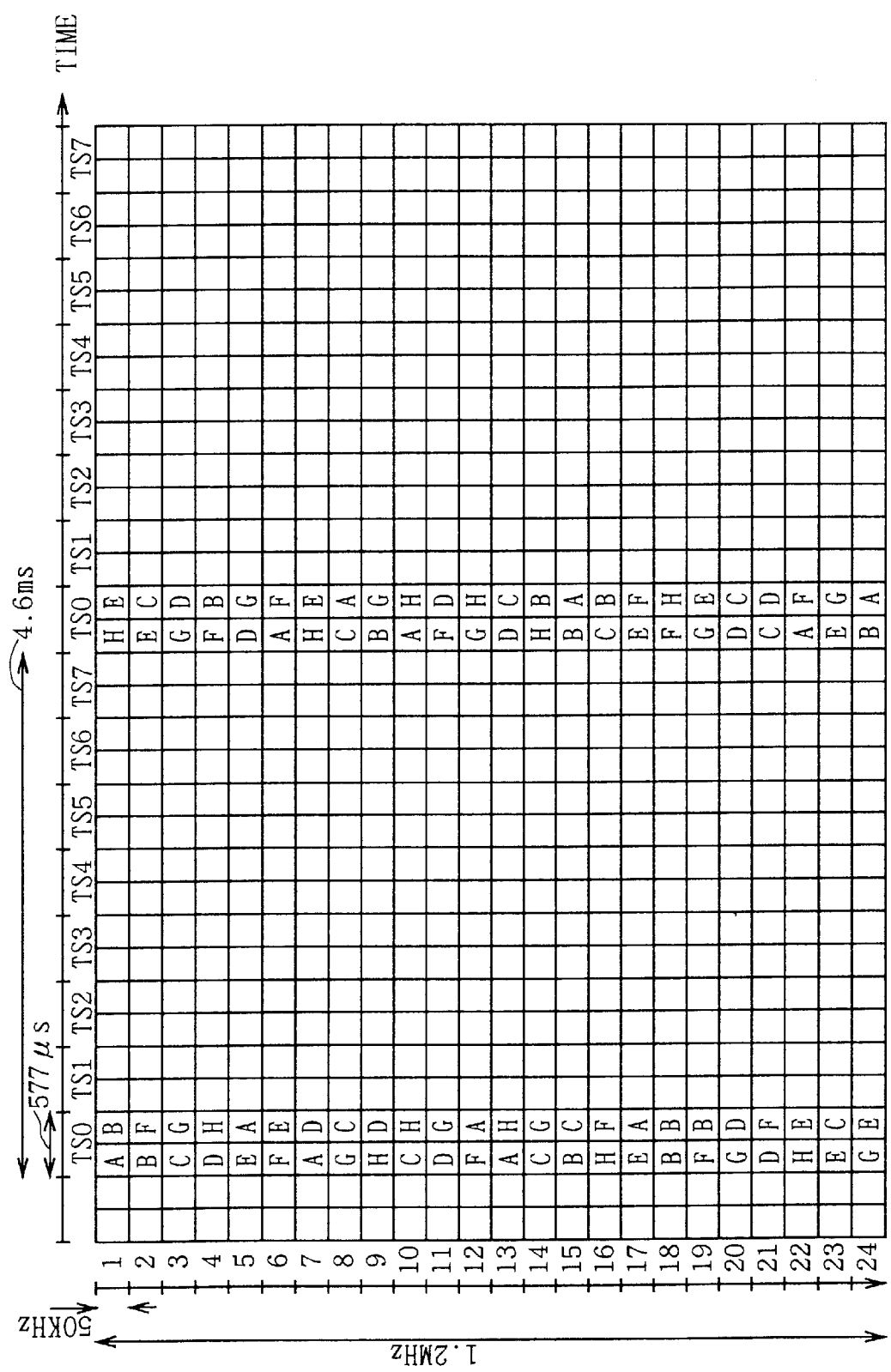
FIG. 9 is a schematic view used in the description of the allocation of blocks to each communication channel.

Now, the allocation example of a communication channel against each block is shown in FIG. 9. As shown in FIG. 9, if eight communication channels which are ensured in time slot TS0 are assumed to be A to H, for communication channel A the first, the seventh, and the thirteenth blocks are allocated at the first half portion of the first time slot TS0, and the fifth, the twelfth, and the seventeenth blocks are allocated at the second half portion of the first time slot TS0. Similarly, for communication channel B, the second, the fifteenth, and the eighteenth blocks are allocated at the first half portion of the first time slot TS0, and the first, the eighteenth, and the nineteenth blocks are allocated at the second half portion of the first time slot TS0. Likewise, for communication channels C to H, three different blocks are allocated so that they do not overlap each other at the first half portion and the second half portion of the first time slot TS0, respectively.

Incidentally, as evident in FIG. 9, for communication channels A to H, blocks are allocated so that they differ from each other at the first half and second half portions of the time slot, and also even in the same time slot TS0, blocks are allocated so that they differ each time. In this manner, in the communication method according to the present invention, blocks are allocated randomly to the communication channels A to H and therefore there is no possibility that one communication channel will continue to use the same block, so receiving the same interference wave through the block at all times can be prevented.

For instance, in the case where communication channel A always uses the first, the second, and the third blocks, if a large interference wave is present in the first, the second, and the third blocks, a large interference wave will be received at all times, and in the worst case, communication will not be able to be performed. However, in the communication method according to the present invention, blocks are allocated randomly to communication channels, whereby a block to be used is changed at all times. Therefore, such reception of a large interference wave at all times can be prevented.

A description will be made of the case where a transmission symbol is actually transmitted by the use of the communication channel formed by such block allocation. In this embodiment, assume that communication is performed by the use of communication channel A formed in time slot TS0 as described above. First, at the transmitting side, an inverse Fourier transformation is performed on a transmission symbol which is an object of transmission, whereby the transmission symbol is superposed in order on the subcarriers within the block allocated to the communication channel A to produce a transmission signal. This transmission signal is transmitted in a burst manner by the use of the time slot TS0 of the communication channel A.

On the other hand, in the case where the transmission signal transmitted by such a communication method is received, the signal component of the time slot TS0 is first extracted from the received signal. Then, a windowing process is performed on the signal component of the time slot TS0, thereby dividing it into the first half portion and second half portion of the time slot TS0. A Fourier transformation process is performed on the respective signal components of the first half portion and second half portion, whereby the symbol allocated to each subcarrier is fetched. Based on the previously grasped block allocation of the communication channel A, among the fetched symbols the symbol fetched from the block allocated to the communication channel A is extracted. With this, the transmission symbol transmitted from the other end of a communication line can be fetched.

Next, the channel interference in the communication method according to the present invention will be described on the assumption that the communication method of the present invention has been applied to a cellular radio communication system. First, in the base station, as described above, a time direction is divided into frames of 4.6 ms in width and also each frame is divided into eight time slots TS0 to TS7, thereby forming slots for TDMA. Also, with respect to the time slots TS0 to TS7, the time direction is further divided into two parts and also the frequency direction is divided into 24 parts, thereby forming 48 blocks. Furthermore, 12 subcarriers are arranged within each block. And among the thus divided blocks, three blocks of the first half portion of one time slot are used and three blocks of the second half portion are used, thereby forming one communication channel and forming eight communication channels per one time slot. Thus, the base station communicates with communication terminal equipment through a desired communication channel of eight communication channels formed for each of the time slots TS0 to TS7.

In this case, since each communication channel within the same time slot uses different blocks, channels are separated from each other in frequency. Therefore, there is no possibility that the transmission signal of the other communication channel which is transmitted by the same base station will have influence on a communication channel of attention as an interference wave. For example, assume that a predetermined base station is communicating with arbitrary communication terminal equipment a by the use of the above-mentioned communication channel A and the base station is communicating with any other communication terminal equipment b by the use of another communication channel B. In this case, the blocks used by the communication channels A and B are different from each other and therefore the communication channels A and B are separated in frequency, so there is no possibility that the transmission signals transmitted with the communication channels A and B will influence each other as interference waves.

Incidentally, as in prior art, in the case of the time-code-division multiple access method, since channel separation is performed by diffusion codes, the signal components of all channels within the same time slot are superposed in the operating band. Therefore, even in communication within the same base station, there is a possibility that the transmission signals of mutual communication channels will influence each other as interference waves. Particularly, in an environment such that a multiple path is present, the orthogonal relation between diffusion codes cannot be maintained, so the transmission signals of mutual communication channels influence each other as interference waves. However, in the communication method according to the present invention, since the blocks which are used by communication channels A to H are different in frequency within the same time slot, there is no possibility that channel interference will occur within at least the same base station.

Also, in an environment where a multiple path is present, generally there is a fear that frequency selective fading will occur. However, in the communication method according to the present invention, a transmission symbol is dispersed into a plurality of subcarriers, so even if frequency selective fading occurs, only the subcarrier of the band in which the frequency selective fading occurs will be degraded and therefore there is no possibility that the communication method will undergo the influence of the frequency selective fading as a whole. Also, since a transmission symbol is dispersed into a plurality of subcarriers, transmission time per one symbol becomes longer, and consequently, even if a delayed signal due to a multiple path occurs, essentially the influence will be small.

Next, channel interference between different base stations will be described with FIGS. 10 and 11. First, in FIG. 10, assume that base station BS-A and base station BS-B use the same frequency band and are communicating with communication terminal equipment MS1 to MS8 and MS11 to MS18. Also, assume that as the communication channels, the base stations BS-A and BS-B use communication channels A to H formed with the above-mentioned communication method, respectively. In the base stations BS-A and BS-B, it is assumed that different blocks are allocated to communication channels A to H by the randomness of block allocation, respectively. In consideration of transmission power control being performed in a general cellular radio communication system, it is also assumed in the cellular radio communication system that the transmission power in each communication is controlled so as to become a necessary and minimum value in a range which satisfies a predetermined quality.

As a result of such transmission power control, assume that the transmission powers of the communication channels A to H of the base station BS-A at a certain timing are obtained as shown in FIG. 11(A) and that the transmission powers of the communication channels A to H of the base station BS-B at the same timing are obtained as shown in FIG. 11(B).

Figure 10:
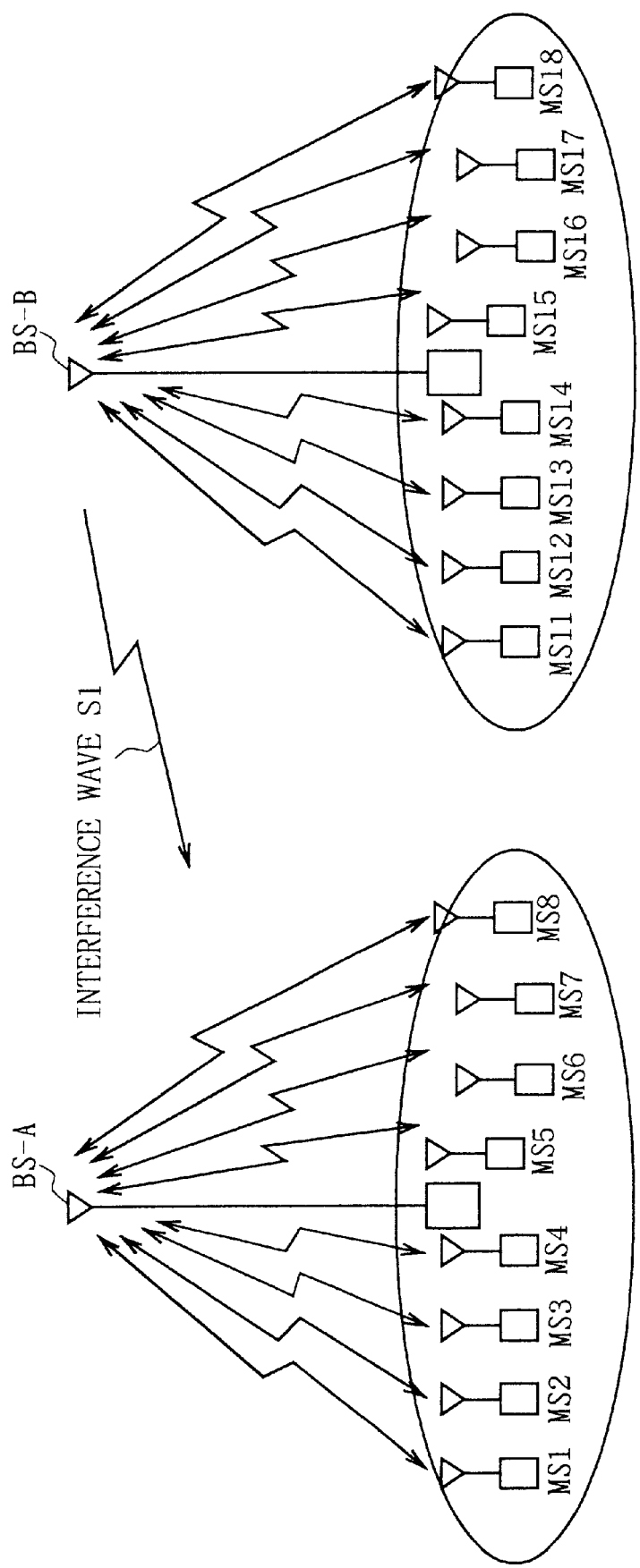
FIG. 10 is a schematic view used in the description of channel interference between different base stations.
Figure 11:
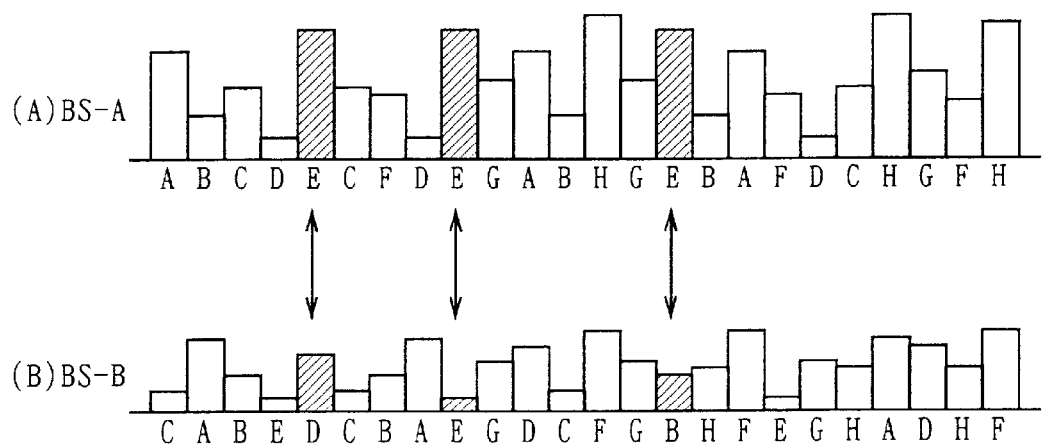
FIGS. 11(A) and 11(B) are schematic views used in the description of an interference wave received from another base station.

As shown in FIG. 10, generally the transmission signal of each of the communication channels A to H which is transmitted by the base station BS-B acts on the communication channels A to H in the base station BS-A as an interference wave SI. However, the electric power of the transmission signal from the base station BS-B acting as this interference wave SI is generally reduced in the cell of the base station BS-A in comparison with the transmission signals of the communication channels A to H in the base station BS-A, because the base station BS-B is away from the base station BS-A.

In such a circumstance, consider channel interference about a certain specific communication channel. For example, if it is assumed that base station BS-A has communicated with communication terminal equipment MS8 through communication channels E, the transmission signals of the communication channels D, E, and B of the base station BS-B which performs transmission by the use of the same block will have influence on the communication channels E of the base station BS-A as interference waves from the relation between FIGS. 11(A) and (B). In this case, in the base stations BS-A and BS-B, since blocks are allocated randomly to the communication channels A to H, the communication channels of the base station BS-B which interfere with the communication channels E of the base station BS-A are not always the same and become random as shown in FIG. 11(B).

Since the transmission powers of the communication channels D, E, and B in the base station BS-B depend on communication environment such as a distance with communication terminal equipment, the transmission powers of the communication channels D, E, and B differ respectively. For this reason, the electric power of the interference wave which is received by the communication channel E of the base station BS-A varies for each block. Also, the communication channel of the base station BS-B which has an influence of interference on the communication channel E of the base station BS-A varies randomly with time, so the electric power of the interference wave which has influence on the communication channel E varies randomly with time.

Therefore, on the basis of these studies, if the whole of the communication through communication channel E is considered, the electric power of the interference wave received from the base station BS-B becomes a common value, and consequently, the communication method according to the present invention can obtain an interference diversity effect against the interference wave from other cells. That is, in the communication method according to the present invention, essentially the allocation of blocks to communication channels is randomly performed, whereby receiving the strong electric power of an interference wave from other cells can be prevented at all times.

Figure 12:
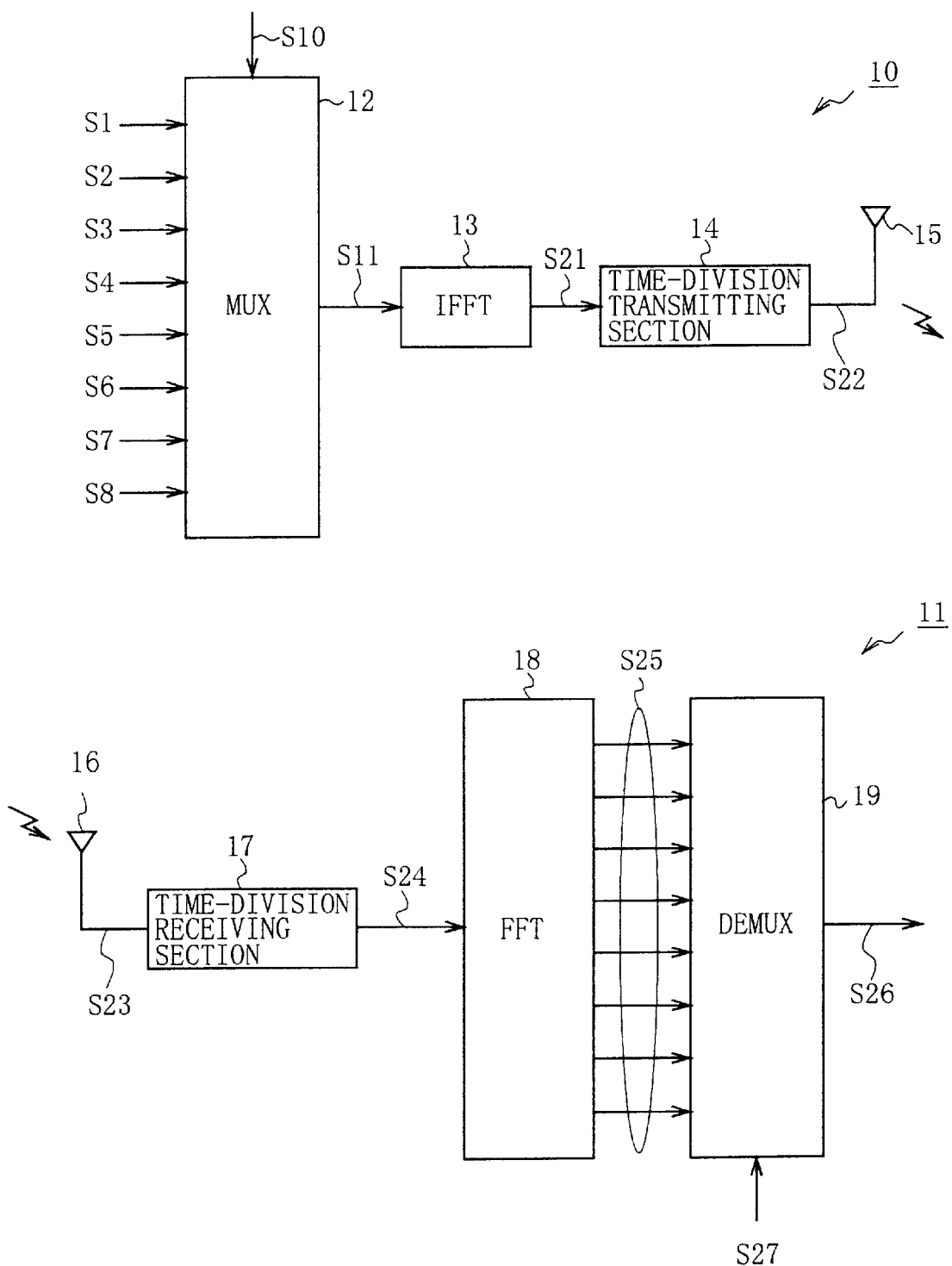
FIG. 12 is a block diagram showing a transmitter and a receiver to which a communication method according to the present invention is applied.

Now, the constitutions of a transmitter and a receiver actually employing such a communication method according to the present invention are shown in FIG. 12. In the FIG., 10 generally denotes a transmitter provided in a base station, and 11 denotes a receiver provided in communication terminal equipment. In the transmitter 10, for example if it is assumed that radio communication of eight channels is present, the transmission symbols S1 to S8 of the eight channels will be input to a multiplexer 12, respectively. In this embodiment, eight channels of a transmission object are assumed to be the above-mentioned eight communication channels A to H formed within one time slot shown in FIG. 9 for the convenience of explanation.

Figure 13:
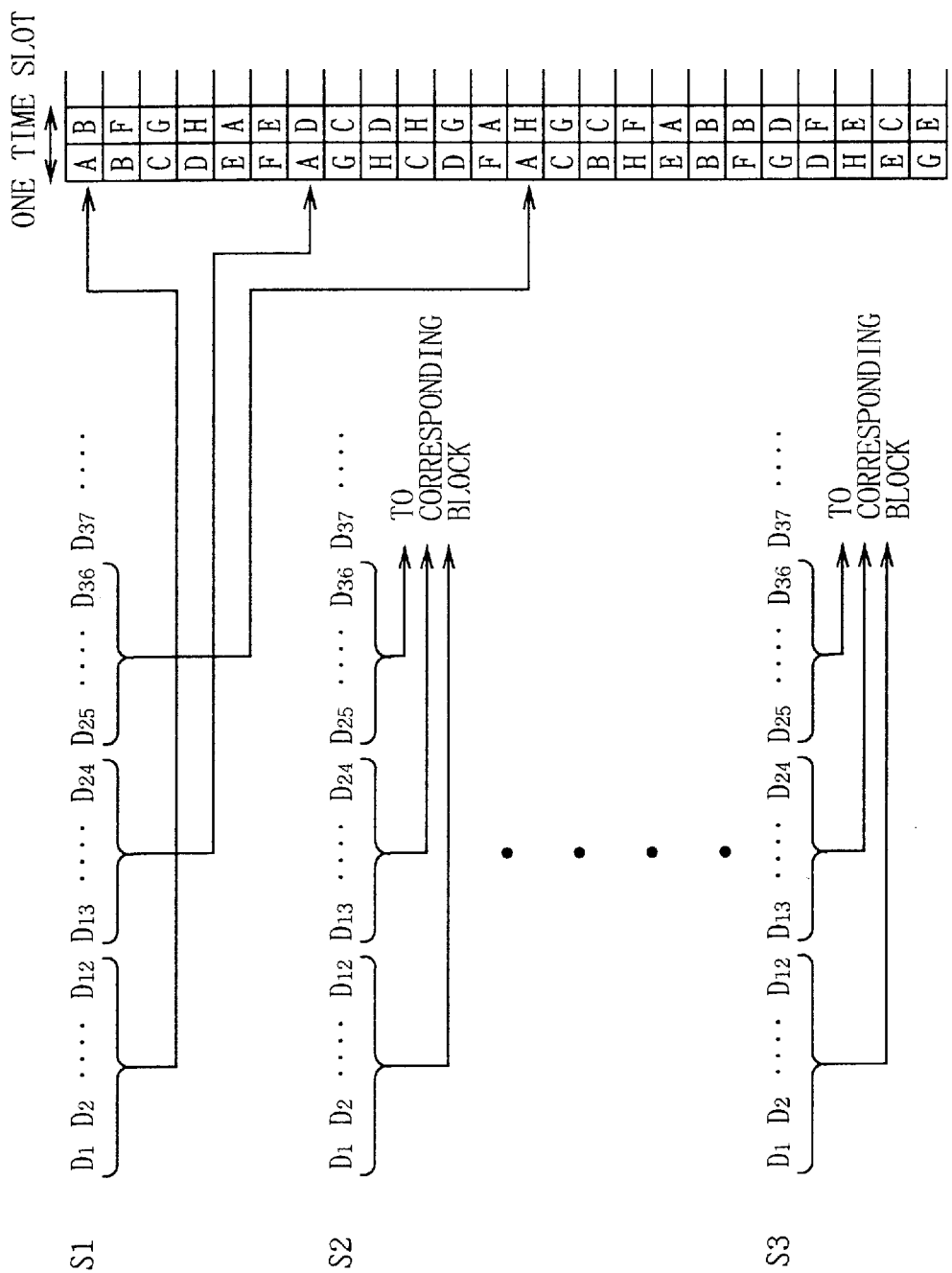
FIG. 13 is a schematic view used in the description of a multiplexer in the transmitter.

To the multiplexer 12 the pattern information S10 of the blocks which are allocated randomly to the communication channels A to H is input. Based on this pattern information S10, the multiplexer 12 rearranges the transmission symbols S1 to S8 so that they correspond to the allocation of blocks to communication channels A to H, thereby generating a single symbol stream S20. For example, if it is assumed that the transmission symbols S1 to S8 are symbols which are transmitted with the communication channels A to H respectively and that the block allocation to the communication channels A to H is the one shown in FIG. 13, the multiplexer 12 first divides each of the input transmission symbols S1 to S8 into groups of 12 symbols and then the divided symbol groups are rearranged in correspondence to the block allocation. For example, since the transmission symbol S1 is transmitted by the use of the communication channels A, the symbol groups are arranged so as to be at the first, the seventh, and the thirteenth blocks. In this manner, the multiplexer 12 rearranges the transmission symbols S1 to S8 in correspondence to the allocation of blocks to communication channels A to H, thereby generating a single symbol stream S20.

An inverse fast Fourier transformation circuit 13 is a modulation circuit for OFDM and performs an inverse Fourier transformation process on the input symbol stream S20, thereby producing a transmission signal S21 such that the symbols in the symbol stream 20 are arranged on the frequency axis at the intervals of the subcarrier. The transmission signal S21 is sent to a time-division transmitting section 14. The time-division transmitting section 14 frequency-transforms the transmission signal 21 into the actual frequency bands of the subcarriers, thereby producing a transmission signal S22 such that the symbols are respectively superposed on the above-mentioned subcarriers. The transmission signal S22 is transmitted in a burst manner through an antenna 15 at the timing of two-divided time slots.

On the other hand, in the receiver 2, a reception signal S23 received by an antenna 16 is input to a time-division receiving section 17. The time-division receiving section 17 performs a temporal windowing process, thereby extracting signal components equivalent to the transmission signal S22 from the reception signal S23. The signal components are given a frequency transformation, whereby a reception signal S24 of the base band corresponding to the transmission signal S21 is obtained. The reception signal S24 is output to a fast Fourier transformation circuit 18.

The fast Fourier transformation circuit 18 is a demodulation circuit for OFDM and performs a fast Fourier transformation process on the reception signal S24, whereby the symbols arranged on a frequency axis are arranged on a time axis and fetched. The symbols are output to a demultiplexer 19 as reception symbols S25. Note that since the fast Fourier transformation circuit 18 performs a fast Fourier transformation process on all bands of 24 blocks, all symbols of communication channels A to H are fetched.

A demultiplexer 19 is a circuit which fetches the symbol of a local communication channel from the symbols of all communication channels A to H on the basis of the pattern information of block allocation. For example, if this receiver 11 is one which receives communication channel A, the demultiplexer 19 will fetch the symbol related to the communication channel A from the reception symbols S25 on the basis of the pattern information S27 of block allocation related to the communication channel A, and will output it as a reception symbol S26. In this manner, with such a process the receiver 11 can restore the symbol information transmitted through local communication channel A.

In the aforementioned constitution, the communication method according to the present invention divides a band of 1.2 MHz into frames of 4.615 ms in width in a time axis direction and further divides each frame at intervals of 577 µs, thereby forming time slots TS0 to TS7 for TDMA. And in each time slot, the time slot is divided into two parts in a time direction and 24 parts in a frequency direction, thereby forming 48 blocks. Within each block, 12 subcarriers are formed. Then, among these blocks, three blocks are selected from the first half portion and three blocks from the second half portion, and with the six blocks, a single communication channel is formed, thereby forming eight communication channels per one time slot.

In performing communication by the use of the communication channels formed in this manner, transmission symbols are respectively allocated to the subcarriers of the blocks of a communication channel and transmitted, thereby transmitting the transmission symbols by OFDM method. In this manner, the communication method according to this invention can realize communication which is difficult to undergo the influence of a multiple path, because the multiplexing in one time slot is not performed by code division as in prior art, but it is performed by OFDM by use of blocks separated in frequency.

Also, the communication method according to the present invention can perform an inverse Fourier transformation on a transmission symbol at the transmitting side and perform communication with only constitution which performs a Fourier transformation on a reception signal at the receiving side. Therefore, in comparison with the case using a multi-user detection which performs decoding in consideration of the interference amount of all channels as in a conventional time-code-division multiple access method, the process amount of the apparatus can be reduced and also apparatus constitution can be simplified.

Furthermore, the communication method according to the present invention can prevent reception of a large interference wave at all times and obtain an interference diversity effect with respect to channel interference, because blocks are allocated randomly to communication channels.

According to the aforementioned constitution, the time slot formed by time-division multiplexing is divided into a plurality of blocks and also within each block a plurality of subcarriers are formed. A communication channel is formed with a predetermined number of blocks, whereby communication channels within one time slot are multiplexed. With this, multiplexing can be performed by communication of multiple carriers separated in frequency. Therefore, with simple constitution, communication can be performed satisfactorily even in an environment where a multiple path is present.

In the above-mentioned embodiment, while it has been described that one frame is 4.615 ms and divided at intervals of 577 µs to form time slots for time-division multiplexing, the present invention is not limited to this, but the values for forming time-division multiplexing time slots may be other values.

Also, in the above-mentioned embodiment, although a description has been made of the case where one time slot is divided into 48 blocks, the present invention is not limited to this, but the number of divided blocks may be other numbers.

In addition, in the above-mentioned embodiment, although a description has been made of the case where the band width is 1.2 MHz and the interval of the subcarrier is 4.17 kHz, the present invention is not limited to this, but frequency numbers may be the other numbers.

Additionally, in the above-mentioned embodiment, although a description has been made of the case where one time slot is divided in a time direction and a frequency direction, the present invention is not limited to this, but one time slot may be divided only in a frequency direction.

In short, if a time slot for time-division multiplexing is divided into a plurality of blocks in at least a frequency direction, also the block is formed with a plurality of subcarriers, then a communication channel is formed with a predetermined number of blocks so that multiplexing is performed within one time slot, and then information of a transmission object is transmitted with multiple carriers through the communication channel, the same effect as the above-mentioned case can be obtained.

INDUSTRIAL APPLICABILITY

In cellular radio communication systems, the present invention is utilized in performing communication between a base station and communication terminal equipment.

REFERENCE NUMERALS 1,10 . . . Transmitter, 1A . . . CDMA modulation section, 1B, . . . Time-division transmitting section, 1C, 2A, 15, 16 . . . Antenna, 2, 11 . . . Receiver, 2B, 17 . . . Time-division receiver, 2C . . . Matched filter, 2D . . . Multi-user detection, 12 . . . Multiplexer, 13 . . . Inverse Fast Fourier transformation circuit, 18 . . . Fast Fourier transformation circuit, 19 . . . Demultiplexer.

What is claimed is:

1. A transmitting method comprising the steps of:
   dividing a time slot formed by time-division multiplexing into a plurality of blocks in at least a frequency direction;
   forming a plurality of subcarriers within each one of said plurality of blocks;
   forming one communication channel with a predetermined number of said plurality of blocks, thereby forming a plurality of communication channels within said time slot; and
   transmitting information of a transmission object with said plurality of subcarriers by using a desired communication channel of said plurality of communication channels, wherein said step of forming one communication channel includes allocating said predetermined number of said plurality of blocks randomly to said one communication channel.

2. A transmitting method comprising the steps of:
   dividing a time slot formed by time-division multiplexing into a plurality of blocks in at least a frequency direction;
   forming a plurality of subcarriers within each one of said plurality of blocks;
   forming one communication channel with a predetermined number of said plurality of blocks, thereby forming a plurality of communication channels within said time slot; and
   transmitting information of a transmission object with said plurality of subcarriers by using a desired communication channel of said plurality of communication channels, wherein said step of transmitting includes superposing said information of said transmission object on said plurality of subcarriers of said desired communication channel, by performing a Fourier transformation on said information of said transmission object.

3. A receiving method, wherein
   when a time slot formed by time-division multiplexing is divided into a plurality of blocks in at least a frequency direction, then a plurality of subcarriers are formed within each one of said plurality of blocks, then one communication channel is formed with a predetermined number of said plurality of blocks, thereby forming a plurality of communication channels within said time slot, and lastly information of a transmission object is transmitted with said plurality of subcarriers by using a desired communication channel of said plurality of communication channels the receiving method comprising the steps of:
   obtaining a reception signal by receiving said time slot which includes said desired communication channel used when said information of said transmission object is transmitted;
   fetching all information of said time slot by performing a Fourier transformation on said reception signal; and
   fetching said information of said transmission object transmitted using said desired communication channel used in communication with a local station from said all information.

4. The receiving method according to claim 3, wherein said one communication channel is a channel formed by allocating said predetermined number of said plurality of blocks randomly.

5. A transmitter comprising:
   transmission means which initially divides a time slot formed by time-division multiplexing into a plurality of blocks in at least a frequency direction, secondly forms a plurality of subcarriers within each one of said plurality of blocks, then thirdly forms one communication channel with a predetermined number of said plurality of blocks, thereby forming a plurality of communication channels within said time slot, and
   means for transmitting information of a transmission object with said plurality of subcarriers by using a desired communication channel of said plurality of communication channels, wherein said transmission means includes means for allocating said predetermined number of said plurality of blocks randomly to said one communication channel.

6. A transmitter comprising:
   transmission means which initially divides a time slot formed by time-division multiplexing into a plurality of blocks in at least a frequency direction, secondly forms a plurality of subcarriers within each one of said plurality of blocks, then thirdly forms one communication channel with a predetermined number of said plurality of blocks, thereby forming a plurality of communication channels within said time slot, and
   means for transmitting information of a transmission object with said plurality of subcarriers by using a desired communication channel of said plurality of communication channels, wherein said transmission means includes means for superposing said information of said transmission object on said plurality of subcarriers of said desired communication channel, by performing a Fourier transformation on said information of said transmission object.

7. A receiver comprising reception means in which, when a time slot formed by time-division multiplexing is divided into a plurality of blocks in at least a frequency direction, then a plurality of subcarriers are formed within each one of said plurality of blocks, then one communication channel is formed with a predetermined number of said plurality of blocks, thereby forming a plurality of communication channels within said time slot, and lastly information of a transmission object transmitted with said plurality of subcarriers by using a desired communication channel of said plurality of communication channels is received, said reception means obtains a reception signal by receiving said time slot which includes said desired communication channel used when said information of said transmission object is transmitted, then fetches all information of said time slot by performing a Fourier transformation on said reception signal, and fetches said information of said transmission object transmitted using said desired communication channel used in communication with a local station from said all information.

8. The receiver according to claim 7, wherein said one communication channel is a channel formed by allocating said predetermined number of said plurality of blocks randomly.

* * * * *